US008434214B2

(12) United States Patent
Marx

(10) Patent No.: US 8,434,214 B2
(45) Date of Patent: May 7, 2013

(54) VEHICLE BODY ASSEMBLY APPARATUS HAVING TRIAXIAL POSITION SENSING

(75) Inventor: Timothy J. Marx, Macomb, MI (US)

(73) Assignee: Utica Enterprises, Inc., Shelby Township, MI (US)

( * ) Notice: Subject to any disclaimer, the term of this patent is extended or adjusted under 35 U.S.C. 154(b) by 0 days.

(21) Appl. No.: 13/190,789

(22) Filed: Jul. 26, 2011

(65) Prior Publication Data

US 2012/0030934 A1 Feb. 9, 2012

Related U.S. Application Data

(60) Provisional application No. 61/370,567, filed on Aug. 4, 2010.

(51) Int. Cl.
*B23P 19/00* (2006.01)
*B23Q 15/00* (2006.01)

(52) U.S. Cl.
USPC .......... 29/700; 29/712; 29/720; 29/721; 29/407.09; 29/407.1

(58) Field of Classification Search .......... 29/700, 29/711, 712, 720, 721, 722, 407.01, 407.09, 29/407.1
See application file for complete search history.

(56) References Cited

U.S. PATENT DOCUMENTS

| | | | |
|---|---|---|---|
| 4,813,125 A | 3/1989 | Dacey, Jr. | |
| 4,976,026 A | 12/1990 | Dacey, Jr. | |
| 5,050,135 A | 9/1991 | Pai et al. | |
| 5,072,506 A | 12/1991 | Dacey, Jr. | |
| 6,691,392 B2 | 2/2004 | Savoy et al. | |
| 6,711,800 B2 | 3/2004 | Savoy | |
| 6,757,635 B2 * | 6/2004 | Topmiller | 702/150 |
| 6,944,927 B2 * | 9/2005 | Nakamura | 29/407.01 |
| 7,055,240 B2 * | 6/2006 | Kelley et al. | 29/787 |
| 7,143,494 B2 | 12/2006 | Savoy | |
| 7,310,587 B2 * | 12/2007 | Topmiller | 702/150 |
| 7,469,473 B2 | 12/2008 | Savoy | |
| 7,607,212 B2 | 10/2009 | Nakamura | |
| 7,913,370 B2 * | 3/2011 | Savoy | 29/407.1 |
| 2003/0110003 A1 * | 6/2003 | Topmiller | 702/150 |
| 2004/0208473 A1 * | 10/2004 | Topmiller | 385/147 |
| 2005/0076495 A1 * | 4/2005 | Kelley et al. | 29/721 |
| 2008/0028693 A1 | 2/2008 | McCauley | |
| 2008/0263911 A1 * | 10/2008 | Shoenmaker et al. | 37/348 |
| 2009/0018728 A1 * | 1/2009 | Sahlin et al. | 701/50 |
| 2009/0276093 A1 | 11/2009 | Bird-Radolovic | |
| 2010/0213930 A1 * | 8/2010 | Proksch et al. | 324/207.18 |

OTHER PUBLICATIONS

Notification of Transmittal of the International Search Report and the Written Opinion of the International Searching Authority Dated Jan. 5, 2012, Application No. PCT/US 11/45312, Applicant Utica Enterprises, Inc.

* cited by examiner

*Primary Examiner* — Essama Omgba
(74) *Attorney, Agent, or Firm* — Brooks Kushman P.C.

(57) ABSTRACT

Vehicle body assembly apparatus (10) includes a sensor assembly (11) having a lateral Y axis slide assembly (20), a longitudinal X axis assembly (22) and a vertical Z axis assembly (24) that respectively include magnetostrictive type linear sensors for sensing X, Y and Z locations of a vehicle body to control vehicle body assembly. Signals of the X, Y and Z locations are sent to a controller (12) that operates a robot (14*r*) that supports an end effector.

2 Claims, 5 Drawing Sheets

VEHICLE BODY ASSEMBLY APPARATUS HAVING TRIAXIAL POSITION SENSING

CROSS-REFERENCE TO RELATED APPLICATIONS

This application claims the benefit of U.S. provisional Application No. 61/370,567 filed Aug. 4, 2010, the disclosure of which is incorporated in its entirety by reference herein.

TECHNICAL FIELD

This invention relates to apparatus for assembling vehicle bodies and having triaxial position sensing for controlling the vehicle body assembly.

BACKGROUND

Vehicle body assembly requires sensing of vehicle body locations along X (longitudinal), Y (lateral) and Z (vertical) axes so as to insure proper location of parts being assembled.

Previously such positioning has been done by X, Y and Z slides that lock in position upon the vehicle body location sensing. See for example U.S. Pat. Nos. 4,813,125 and 4,976,026, both Dacey, Jr.

Other vehicle body position sensing and positioning is disclosed by U.S. Pat. No.: 5,072,506 Dacey, Jr.; U.S. Pat. No. 6,691,392 Savoy et al.; U.S. Pat. No. 6,711,800 Savoy; U.S. Pat. No. 6,944,923 Nakamura; U.S. Pat. No. 7,607,212 Nakamura; U.S. Pat. No. 7,143,494 Savoy; and U.S. Pat. No. 7,469,473 Savoy.

SUMMARY

An object of the present invention is to provide improved apparatus for assembling vehicle bodies.

In carrying out the above object, the apparatus includes a senor assembly for sensing longitudinal X, lateral Y and vertical Z positions of a vehicle body in connection with assembly of the vehicle body. The sensor assembly includes a pin movable in the X and Z directions and a pad movable in the Y direction. X, Y and Z magnetostrictive linear position sensors of the sensor assembly sense the pin and pad positions to generate signals of the X, Y and Z positions sensed. A controller of the apparatus receives the X, Y and Z signals from the sensor assembly, and a vehicle body assembly device is operated by the controller for use in vehicle body assembly with the signals of the X, Y and Z positions from the sensor assembly through the assembly device provide assembly manipulation of the vehicle body.

As disclosed, the assembly device is a robot for supporting an end effector that is manipulated by the robot to perform the vehicle body assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
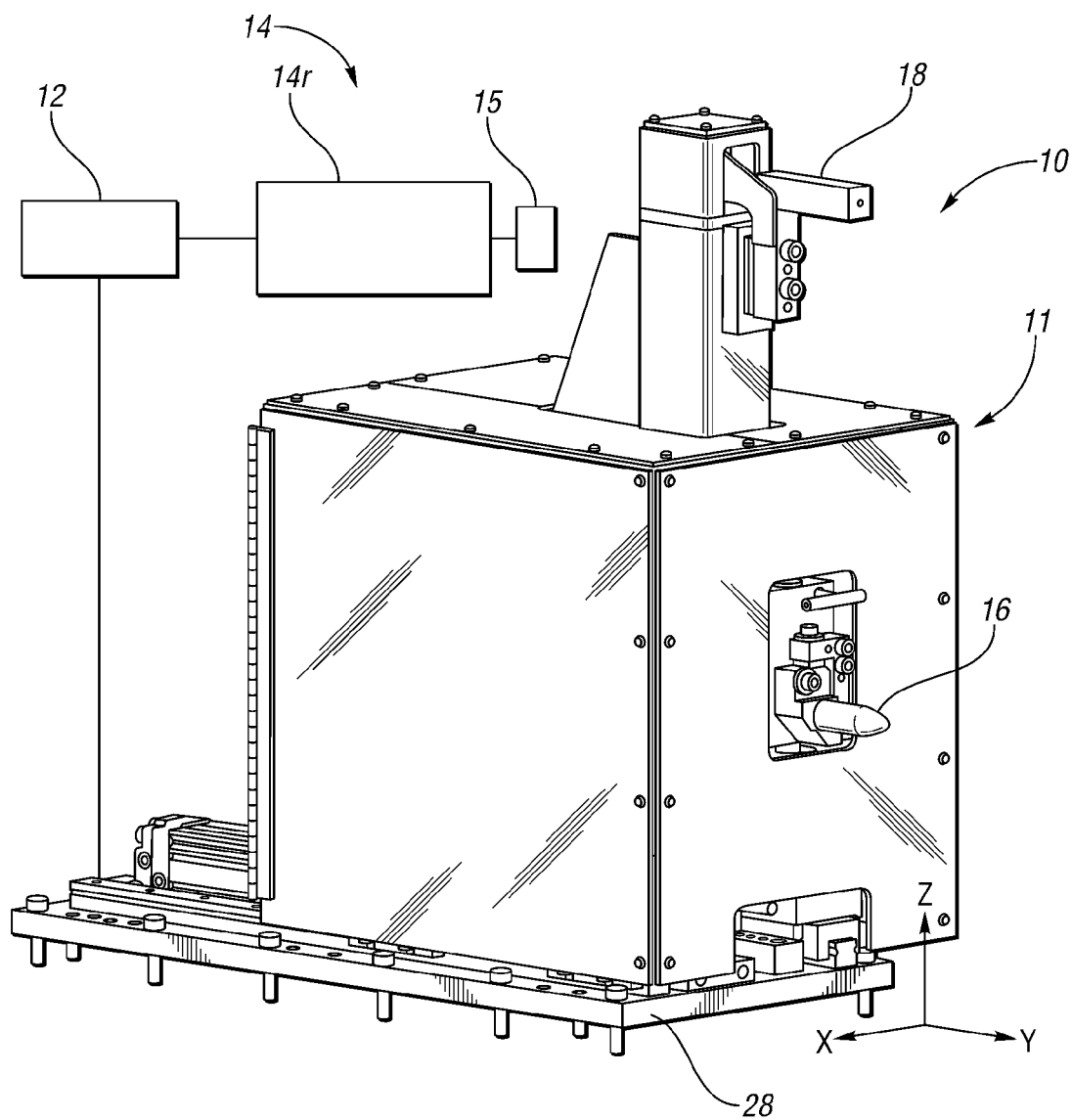
FIG. 1 is a perspective and partially schematic view of vehicle body apparatus constructed in accordance with the invention with triaxial position sensing.

With reference to FIG. 1, apparatus 10 for providing vehicle body assembly is indicated generally by 10 and includes a sensor assembly 11 that is operable to provide triaxial position sensing along X, Y and Z axes and to generate electronic signals of the X, Y and Z positions sensed, a central controller 12 that receives the X, Y and Z signals from the controller, and a vehicle body assembly device 14 that is disclosed as a robot 14r for supporting an end effector 15. The controller 12 operates the robot so the end effector provides a vehicle body assembly operation such as placement of parts to be assembled, assembly of parts by welding or fasteners, etc.

As disclosed, a central pin 16 is operable to sense X and Z positions and an upper sensing pad 18 senses the Y location remotely from the X and Z locations sensed. It is also possible for the pin 16 to have a surface for sensing the Y location as well as the X and Z locations at the same location.

Figure 2:
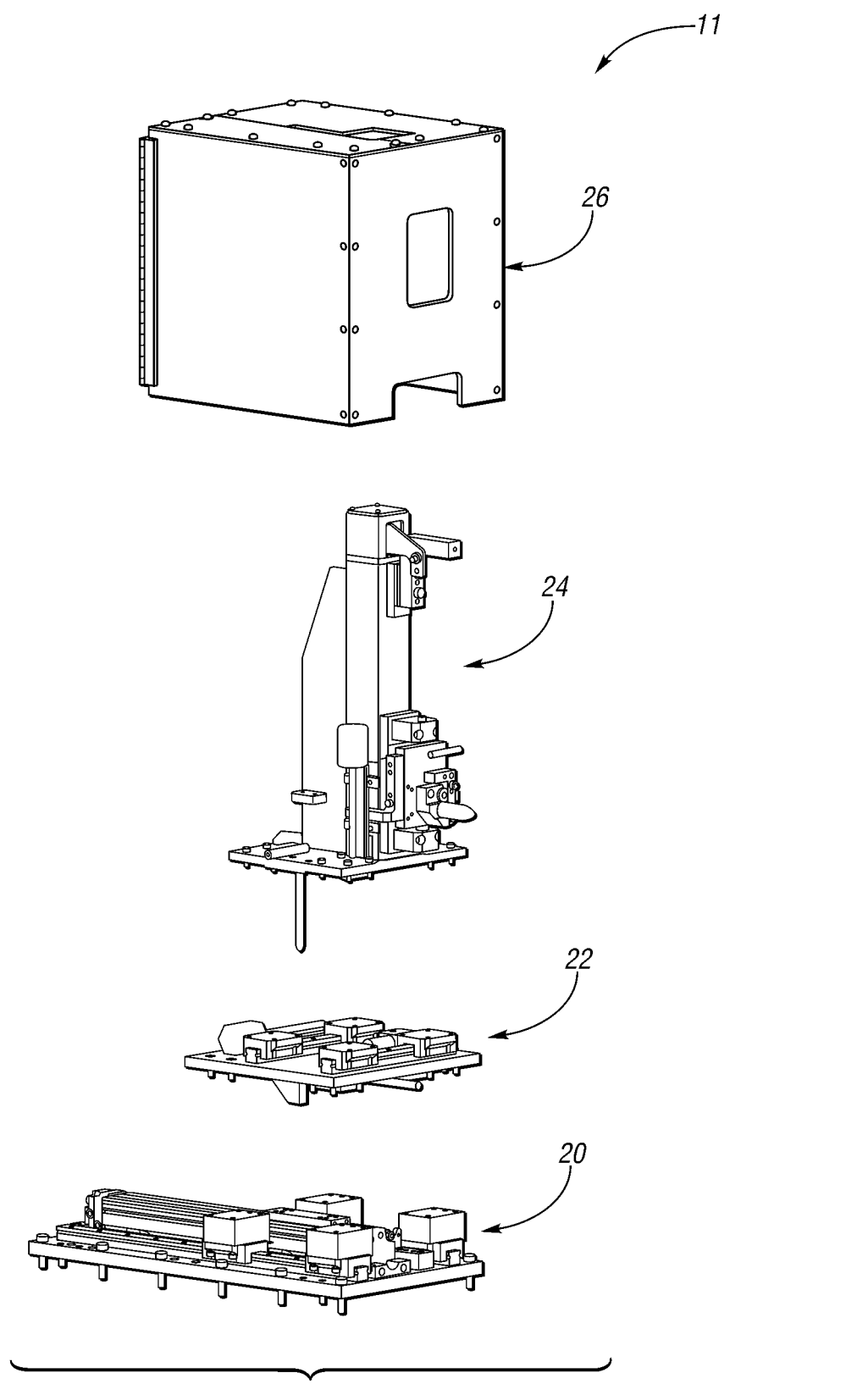
FIG. 2 is an exploded perspective view of a sensing assembly of the apparatus.

As shown in FIG. 2, the triaxial position sensor assembly 11 includes a lateral Y slide assembly 20, a longitudinal X slide assembly 22, and a vertical Z slide assembly 24 as well as a housing 26 that receives and encloses the slide assemblies.

Figure 3:
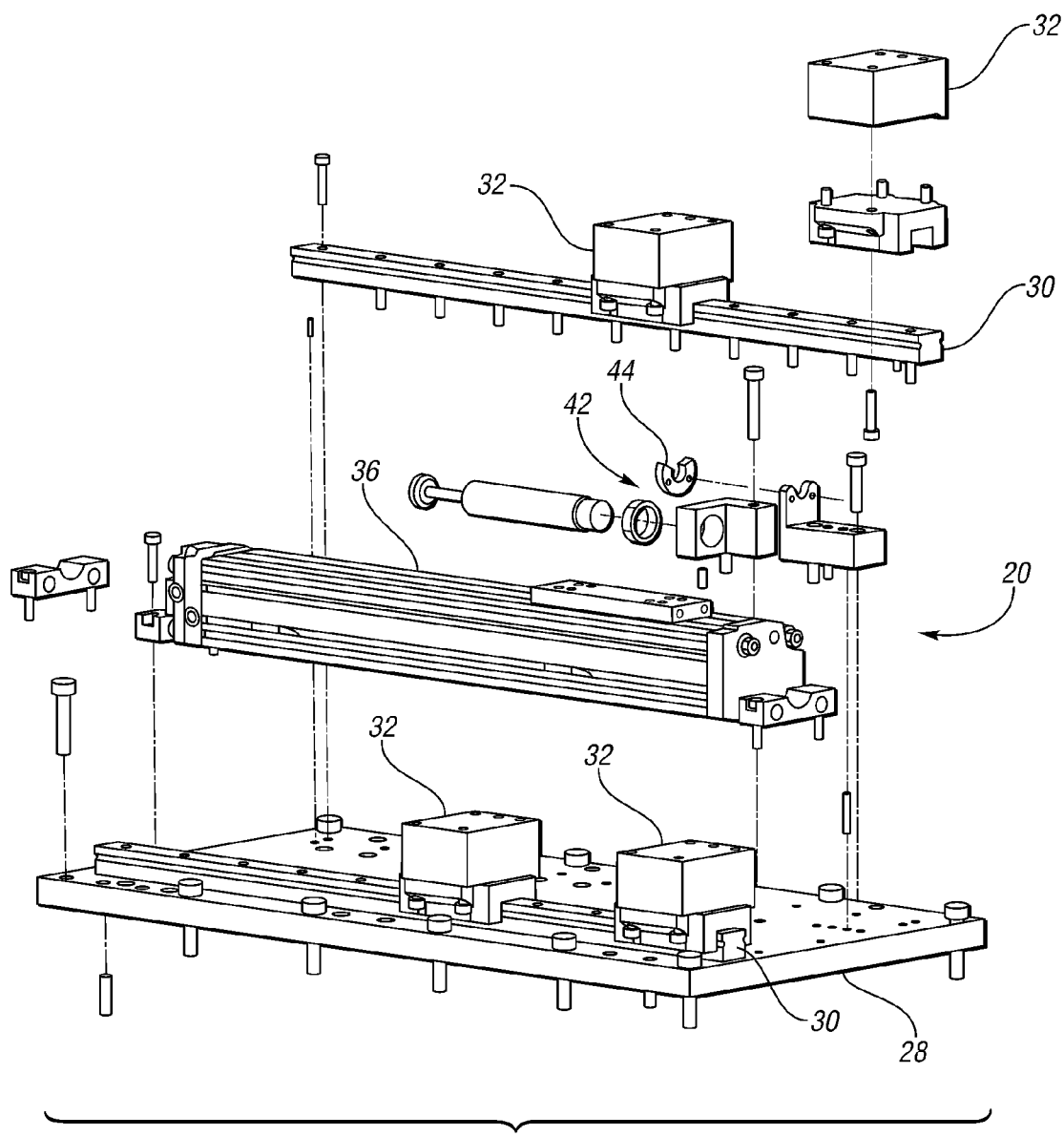
FIG. 3 is an exploded perspective view of a portion of FIG. 2 showing Y axis sensing components.

As shown in FIG. 3, the Y slide assembly 20 has a stationary base 28 including a pair of slide tracks 30 mounted on the base and block slides 32 movable along the tracks 30. The X slide assembly 22 shown in FIG. 4 includes a movable upper base 34 mounted on the block slides 32 of the Y slide assembly 20 shown in FIG. 4. Operation of a Y cylinder 36 provides movement of the upper base 34 along the Y direction.

Figure 4:
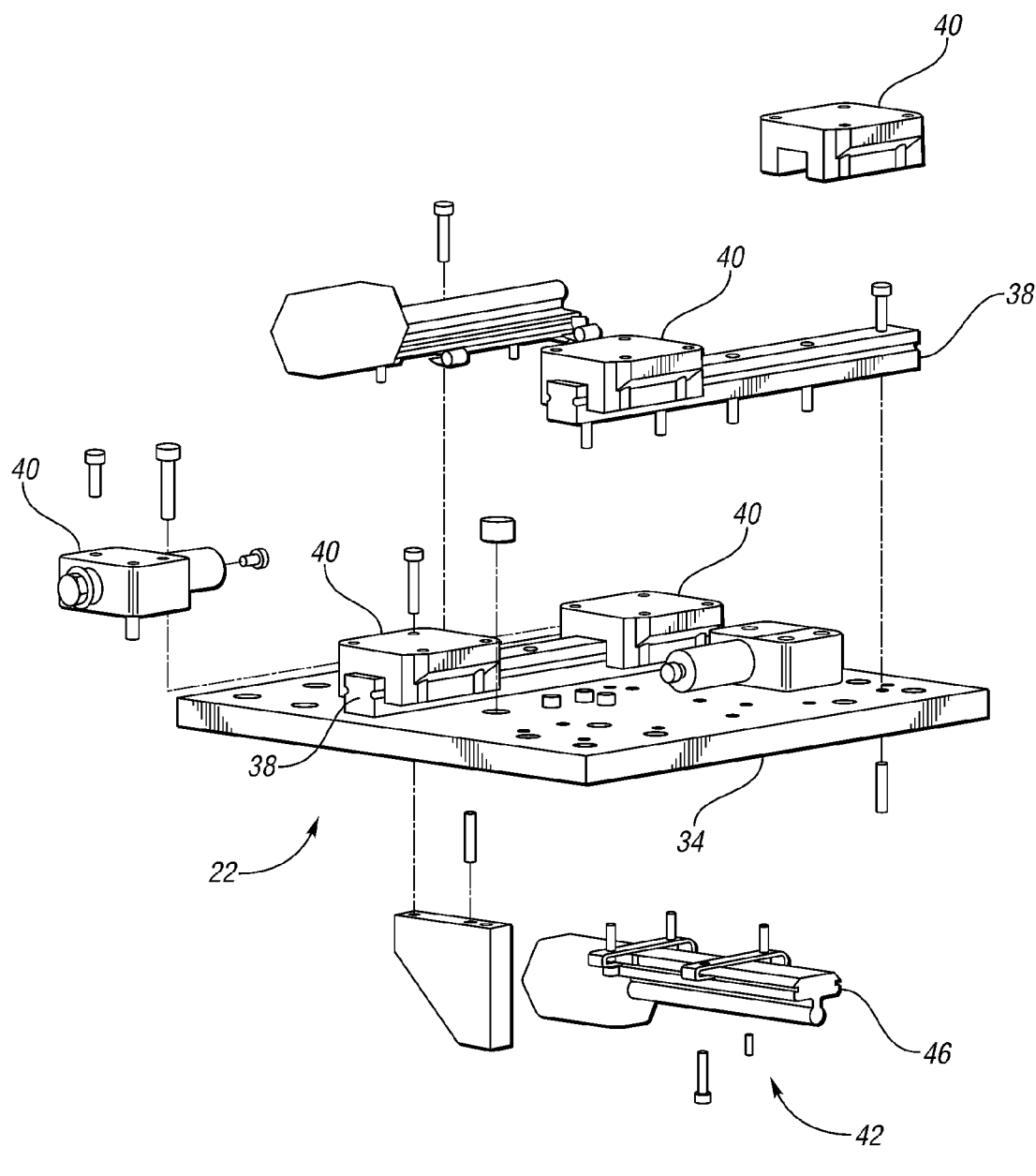
FIG. 4 is an exploded perspective view of a portion of FIG. 2 showing X axis sensing components.

The X slide assembly 22 shown in FIG. 4 includes tracks 38 mounted on the topside of the upper base 34 and also has block slides 40 movable along the tracks 38.

A Y axis linear sensor is collectively indicated by 42 in FIG. 4 and includes a permanent magnet 44 mounted on the stationary base 28 (FIG. 3) and a linear position sensor 46 (FIG. 4) that is mounted on the bottom side of the upper base 34, is movable through the permanent magnet 44, and is of the magnetostrictive type so as to sense Y axis movement.

Figure 5:
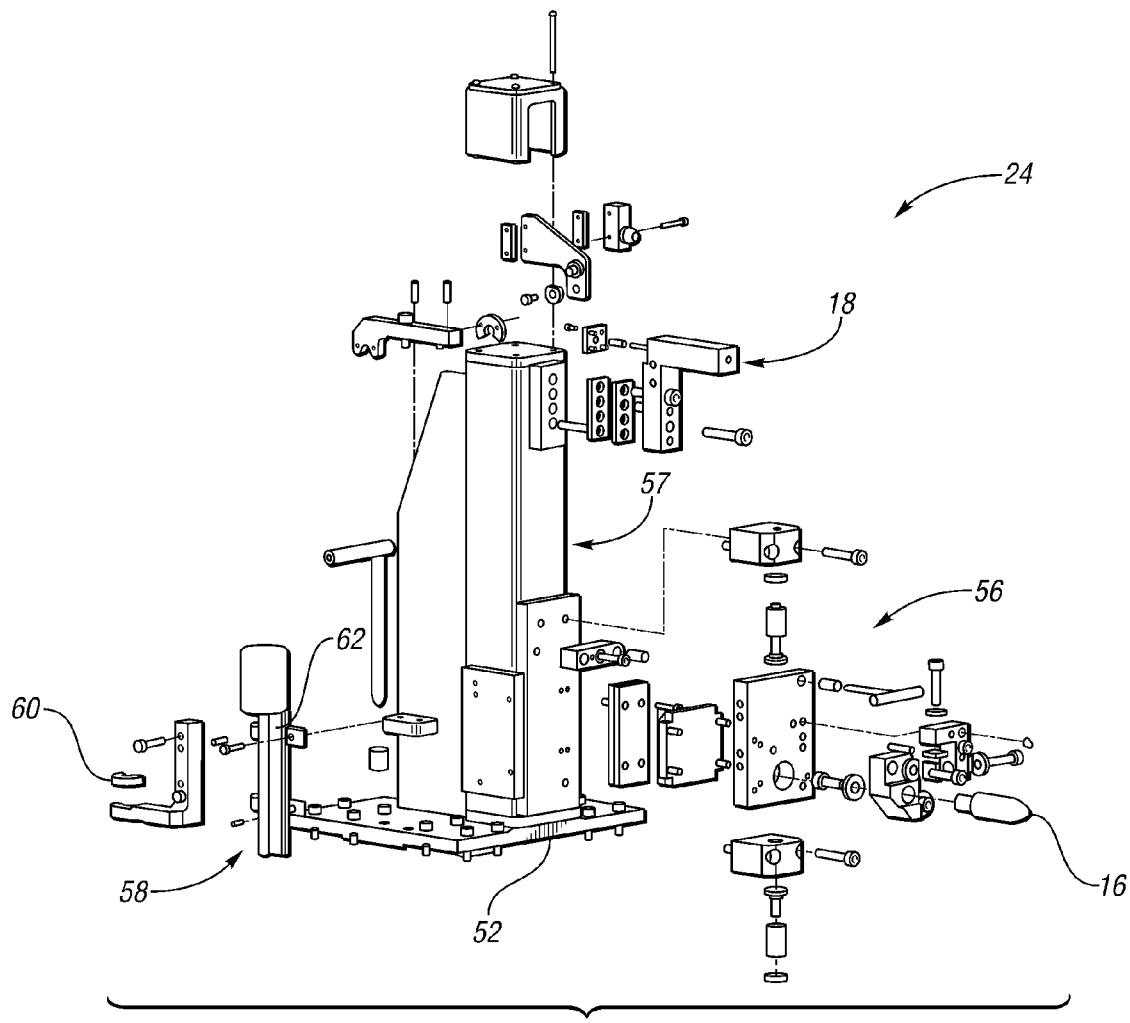
FIG. 5 is an exploded perspective view of a portion of FIG. 2 showing Z axis sensing components.
Figure 6:
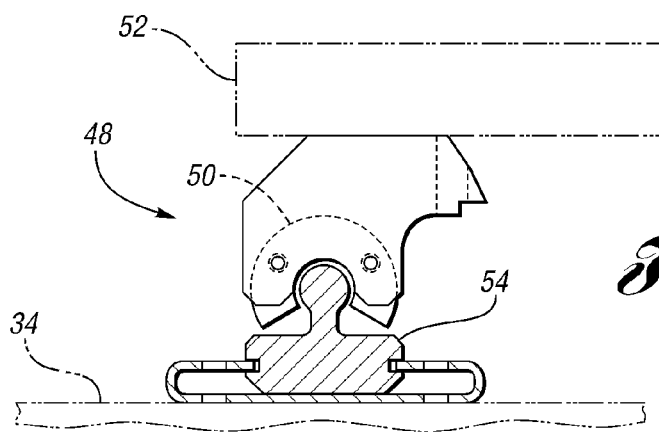
FIG. 6 is a sectional view showing an X axis sensor of the apparatus.

Another sensor 48 of the magnetostrictive type is illustrated in FIG. 6 and includes a permanent magnet 50 mounted on a top base 52 of the Y slide assembly 22 (FIG. 5) and a linear position sensor 54 received by the permanent magnet 50 and mounted on the upper base 34 to sense X axis positioning.

With reference to FIG. 5, the Z slide assembly 24 includes a slidable track mount 56 that mounts the pin 16 for vertical movement on an upstanding vertical tower 57 on the top base 52 along the vertical Z axis and a sensor 58 of the magnetostrictive type. This sensor 58 includes a permanent magnet 60 mounted on top base 52 and a linear position sensor 62 on mount 56 and received by the permanent magnet 60 to sense positioning of the pin 16 along the Z axis.

Operation of the Y axis cylinder moves the pin 16 in the Y direction into a vehicle body target hole as the pin is back driven in the X and Z directions. Upon the upper pad 18 contacting the vehicle body, the lower X and Z positions and the upper Y position, whose X and Z positions are then also sensed, provide the electronic data for vehicle body assembly at the proper location in all three directions.

The sensors 42, 48 and 58 are of the type sold by MTS Systems Corporation of Cary, N.C. under the product designation Temposonics.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Apparatus for assembling vehicle bodies comprising:
a sensor assembly for sensing longitudinal X, lateral Y, and vertical Z positions of a vehicle body in connection with assembly of the vehicle body;
the sensor assembly including a stationary base, an upper base, and a top base, the top base including a vertical tower mounting a Y sensing pad;
a Y slide assembly of the sensor assembly including tracks and slide blocks that mount the upper base on the stationary base for movement along the lateral Y direction;
an X slide assembly of the sensor assembly including tracks and slide blocks that mount the top base with the vertical tower and a pin thereon on the upper base for movement along the longitudinal X direction;
a Z slide assembly including a slidable track mount that mounts the pin on the vertical tower for movement along the vertical Z direction;
an X magnetostrictive linear position sensor that senses the longitudinal X position of upper base and thus of the pin of the vertical tower on the top base along the X direction;
a Y magnetostrictive linear position sensor that senses the lateral Y position on the stationary base of the upper base and thus of the Y sensing pad on the vertical tower along the Y direction;
a Z magnetostrictive linear position sensor that senses the vertical Z position of the pin on the vertical tower along the Z direction;
the X, Y, and Z magnetostrictive linear position sensors of the sensor assembly generating signals of the X, Y, and Z positions sensed;
a controller that receives the X, Y, and Z signals from the sensor assembly; and
a vehicle body assembly device operated by the controller for use in the vehicle body assembly with the signals of the X, Y, and Z positions from the sensor assembly through the assembly device providing assembly manipulation of the vehicle body assembly.

2. Apparatus for assembling vehicle bodies comprising:
a sensor assembly for sensing longitudinal X, lateral Y, and vertical Z positions of a vehicle body in connection with assembly of the vehicle body;
the sensor assembly including a stationary base, an upper base, and a top base, the top base including a vertical tower mounting a Y sensing pad;
a Y slide assembly of the sensor assembly including tracks and slide blocks that mount the upper base on the stationary base for movement along the lateral Y direction;
an X slide assembly of the sensor assembly including tracks and slide blocks that mount the top base with the vertical tower and a pin thereon on the upper base for movement along the longitudinal X direction;
a Z slide assembly including a slidable track mount that mounts the pin on the vertical tower for movement along the vertical Z direction;
an X magnetostrictive linear position sensor that senses the longitudinal X position of upper base and thus of the pin of the vertical tower on the top base along the X direction;
a Y magnetostrictive linear position sensor that senses the lateral Y position on the stationary base of the upper base and thus of the Y sensing pad on the vertical tower along the Y direction;
a Z magnetostrictive linear position sensor that senses the vertical Z position of the pin on the vertical tower along the Z direction;
the X, Y, and Z magnetostrictive linear position sensors of the sensor assembly generating signals of the X, Y, and Z positions sensed;
a controller that receives the X, Y, and Z signals from the sensor assembly; and
a vehicle body assembly robot for supporting an end effector that is manipulated by the robot which is operated by the controller and the signals of the X, Y, and Z positions from the sensor assembly to perform the vehicle body assembly.

* * * * *